United States Patent [19]

Fenton

[11] Patent Number: 4,857,125
[45] Date of Patent: Aug. 15, 1989

[54] METHOD FOR REINFORCING CONICAL SHAPED OBJECT

[75] Inventor: Richard M. Fenton, Hatboro, Pa.

[73] Assignee: General Electric Company, Philadelphia, Pa.

[21] Appl. No.: 110,196

[22] Filed: Oct. 19, 1987

Related U.S. Application Data

[62] Division of Ser. No. 944,173, Dec. 22, 1986, Pat. No. 4,751,135.

[51] Int. Cl.$^4$ ............................................. B32B 5/12
[52] U.S. Cl. ..................................... 156/169; 156/172; 156/173; 156/180; 428/105; 428/113
[58] Field of Search .............. 156/173, 175, 172, 180, 156/148, 166, 169; 428/105, 113, 364, 367, 542.8

[56] References Cited

U.S. PATENT DOCUMENTS

| | | | |
|---|---|---|---|
| 3,031,361 | 4/1962 | Strickland | 156/175 X |
| 3,645,833 | 2/1972 | Figge | 156/175 X |
| 3,700,535 | 10/1972 | McCoy et al. | 156/175 X |
| 4,168,337 | 9/1979 | Maistre | 428/113 |
| 4,201,611 | 5/1980 | Stover | 156/155 |
| 4,252,588 | 2/1981 | Kratsch et al. | 156/89 X |
| 4,268,560 | 5/1981 | Maistre | 428/113 X |
| 4,354,888 | 10/1982 | Bompard et al. | 156/175 |
| 4,366,658 | 1/1983 | Maistre | 52/648 |
| 4,394,203 | 7/1983 | Bompard et al. | 156/175 |
| 4,400,421 | 8/1983 | Stover | 428/105 X |
| 4,721,645 | 1/1988 | Brazel | 428/113 |

*Primary Examiner*—Michael W. Ball
*Assistant Examiner*—Jeff H. Aftergut
*Attorney, Agent, or Firm*—Allen E. Amgott; Paul Checkovich

[57] ABSTRACT

Radially extending fibers are disposed over a conical surface at predetermined sites. The sites correspond to vertices of a pattern of contiguous congruent squares inscribed onto the surface of a sector of a circle which may be conformally mapped into the conical surface. Vertices of the pattern coincide along the join line meridian of the conical surface. Fibers are disposed along element paths between the radially extending fibers and preferably, a continuous fiber is used. The material obtained is without any seams or discontinuities and exhibits an invariant fiber volume fraction along the axis and circumference of the conical surface. The material may be used to reinforce an object having a conical surface or to fabricate a preform.

14 Claims, 5 Drawing Sheets

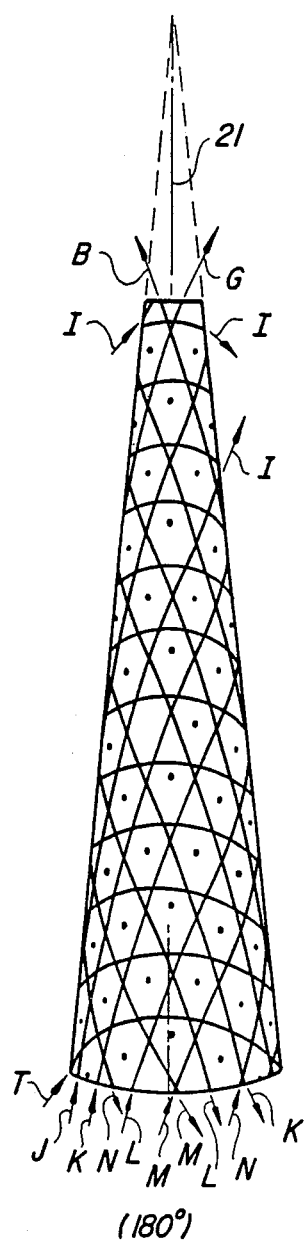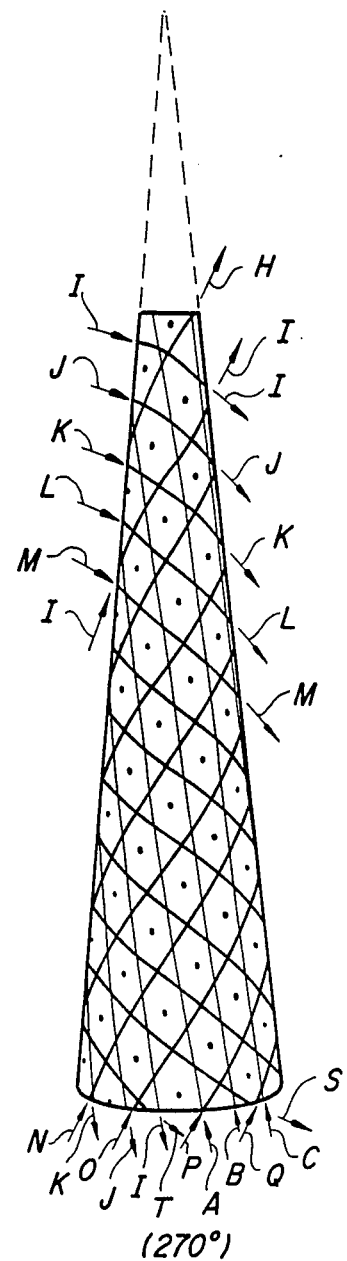
FIG. 3C (180°)
FIG. 3D (270°)

METHOD FOR REINFORCING CONICAL SHAPED OBJECT

This is a division of Ser. No. 06/944,173, filed Dec. 22, 1986, now U.S. Pat. No. 4,751,135.

BACKGROUND OF THE INVENTION

This invention relates to a method for reinforcing a conical shaped object and object formed therewith and, more particulaly, to a method for reinforcing a conical shaped object with fiber elements and to a conical preform formed from fiber elements, wherein the fiber volume fraction along the axis and circumference of the conical surface remains invariant.

In certain applications, like when an object is expected to be exposed to a relatively harsh environment, typically a composite material is used to form the object or to be applied to surfaces of the object for protection against the environment and/or for reinforcing the object. It is desirable that the composite material have a substantially constant fiber element reforcement fraction over the surface of the object so that significant composite property disparities between areas of the surface are avoided, thereby permitting accurate predictions of composite material response to the environment. It has been especially difficult to obtain a constant fiber reinforcement fraction along the axis of a conical or other axially increasing diameter shell structure.

Prior three-dimensional fiber reinforcement patterns have drawbacks when configured to form or conform to a conical surface. These include: failing to maintain constant radial and in-plane (i.e. conformed to the conical surface) fiber reinforcement fractions along the length of the conical surface while maintaining continuous paths for winding the in-plane fibers through a radially disposed fiber array; or failing to provide continuous paths for winding the in-plane portion of the fiber reinforcement material while maintaining a lesser variation of constant radial and in-plane fiber volume fractions along the length of the conical surface. For the former case, which is typical of three-directional reinforcement designs, significant variations in structural properties occur along the length of the conical surface since the radial and in-plane fiber reinforcement fractions vary with axial position along the conical surface. In the latter case, discontinuities in the in-plane fiber reinforcement paths results in structural deficiencies and make fabrication of a fiber reinforcement preform impractical.

U.S. Pat. No. 4,519,290—Inman et al. discloses a three-dimensional four directional (4D) braided preform fabrication for making annular or conical sections to be used in producing articles. The 4D fiber architecture includes a plurality of rods of carbon fibers uniformly distributed over the surface and inserted into a conical mandrel perpendicular to the conical centerline as shown in FIG. 2 of the patent. Oblique carbon or graphite fibers are then passed alternately over and under similar longitudinal fibers around the radially extending rods to provide a triaxial braided pattern having a repeating unit cell that is illustrated in FIG. 6 of the patent. However, the 4D fiber architecture described in U.S. Pat. No. 4,519,290 does not achieve invariance of fiber volume fraction along the conical surface.

A 4D triangular fiber arrangement is described in a DTIC report ADB049350 entitled "Boron Nitride—Boron Nitride Composite Material" by Potter and Place. FIG. 4 of the Potter and Place report illustrates a cylindrical configuration having three triangularly related fibers disposed in a plane perpendicular to the axis of the cylinder and one fiber disposed in a plane parallel to the axis of the cylinder. This fiber arrangement would not generate a constant fiber volume fraction of radial fibers over a conical shell, nor would a constant fiber volume fraction be obtained in the conical surface direction of the shell without addition of new fiber ends.

U.S. Pat. No. 4,570,166—Kuhn et al., describes conformal mapping of a planar sector of a circle, having a grid pattern of isosceles triangles inscribed therein, onto the surface of a cone corresponding to the sector in the context of an RF transparent conically shaped antenna shield structure. The vertices of the triangles are used to situate RF components in the antenna shield structure.

Accordingly, it is an object of the present invention to provide a method for forming a three dimensional fibrous element preform having a conical surface, wherein the preform includes an invariant fiber volume fraction along with the axis and circumference of the conical surface.

Another object is to provide a method for reinforcing an object having a conical surface, wherein a single fiber element may be used to form the in-plane fraction while obtaining invariant fiber fraction along the axis and circumference of the conical surface.

SUMMARY OF THE INVENTION

In accordance with the present invention, a preform having a conical surface includes a plurality of first elements with respective ones of the first elements disposed over the conical surface at respective vertices of contiguous congruent squares and a plurality of second elements configured for defining the conical surface. Respective ones of the second elements are disposed between respective predetermined ones of the first elements such that four segments of the second elements pass through a square. Two segments intersect a respective pair of opposite sides of the square and the other two segments intersect a respective pair of adjacent sides of the square, wherein one pair of adjacent sides has no side in common with the other pair of adjacent sides. The conical surface may be defined by a conformed sector of a circle wherein predetermined squares have a diameter lying coincident with the radial bisector of the sector. The vertex of the square on the radial bisector that is closest the center of the circle is spaced a distance equal to an integral (i.e. 0, 1, 2, 3, . . . ) multiple of the diameter of a square from the center of the circle.

In another aspect of the present invention, a method for reinforcing an object having a conical surface includes disposing respective ones of a plurality of first elements at respective vertices of a plurality of contiguous congruent shapes, which are comformable to the conical surface, and laying respective ones of a plurality of second elements between respective predetermined ones of the first elements for forming a first layer conforming to the conical surface. The second elements are arranged such that an invariant fiber volume fraction is obtained along the axis and circumference of the conical surface. The first elements are preferably disposed to be substantially perpendicular to a respective localized portion of the conical surface. The second elements may be positioned so that four segments pass through a square, two segments intersecting a respective pair of opposite sides of the square and two segments intersecting a respective pair of adjacent sides, wherein one pair of adjacent sides has no side in common with the other pair of adjacent sides. The second elements may also constitute a continuous member so that the entire first layer may be formed from the member without interruption or insertion of additional ends. The conical surface may be defined by a conformally arranged sector of a circle having the vertices of the squares identifiable thereon. Predetermined squares have their diameters coincident with the radial bisector of the sector and the vertex on the bisector that is closest the circle is spaced an integral number of diameters of a square from the center of the circle. The first and second elements may be densified to form an integral unit.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIGS. 3A–3D illustrate a conical surface, having winding paths disposed thereover in accordance with the present invention.

DETAILED DESCRIPTION

Figures 1A, 1B:
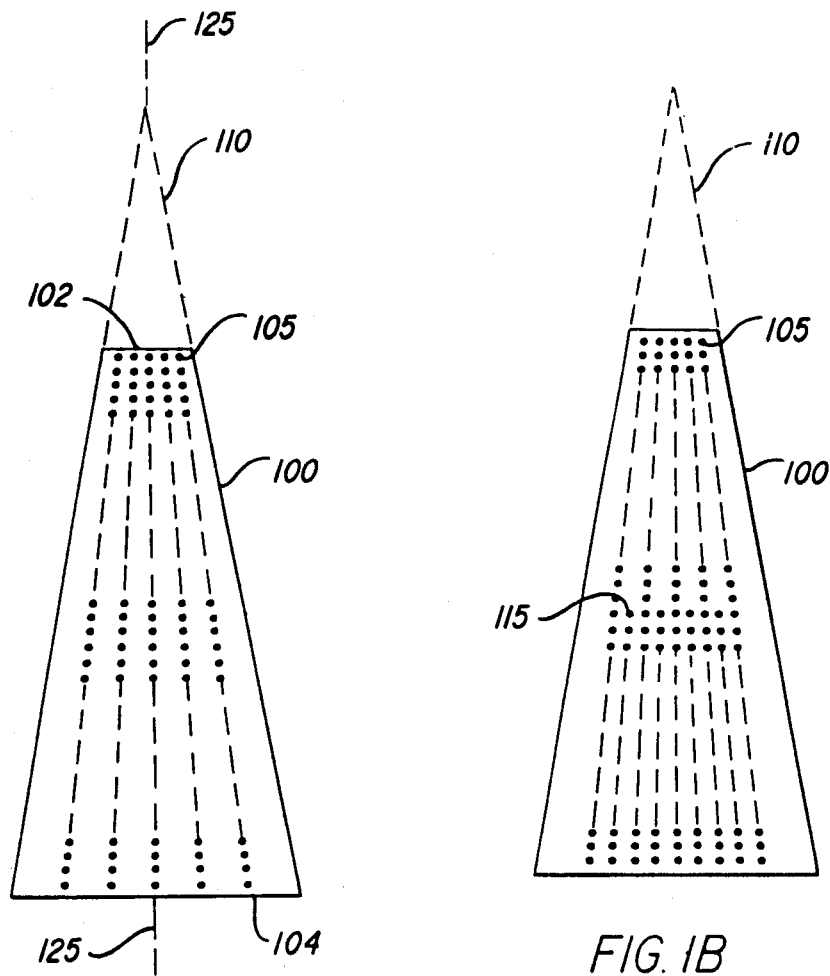
FIGS. 1A and 1B show respective winding patterns wherein non-uniform fiber reinforcement fractions are obtained.

Referring to FIGS. 1A and 1B, a frustum 100 of a cone 110 is shown having a grid pattern 105 for locating radially (with respect to central axis 125, which may be an axis of revolution of cone 110) extending fibers from the conical surface of frustum 100. For a predetermined constant number of equally circumferentially spaced grid members of grid pattern 105 that are disposed in a circumferential row of grid 105 and for a predetermined equal axial spacing between adjacent circumferential rows of grid members of grid 105, the arcuate circumferential spacing between adjacent members of a row increases for each respective row that is closer to larger base 104 of frustum 100. Thus the radial fiber reinforcement fraction monotonically decreases from smaller base 102 to larger base 104 of frustum 100.

As shown in FIG. 1B, an additional grid pattern 115 is disposed over the lower portion of the conical surface of frustum 100 so that a meridional column of grid pattern 115 is situated between adjacent meridional columns of grid pattern 105. Thus grid pattern 115 doubles the number of grid elements for the portion of the surface of frustum 100 over which it is disposed. Placement of grid pattern 115 may be selected so that the arcuate circumferential spacing between members of grid 105 and grid 115 toward smaller base 102 of frustum 100 is approximately equal to the arcuate circumferential spacing between members of grid 105 at smaller base 102 of frustum 100. Grid 115 is shown starting at about the midpoint between base 102 and 104 and extending toward base 104.

Although the addition of grid pattern 115 to grid pattern 105 does produce a fiber reinforcement fraction along the axis of frustum 100 that is more uniform between bases 102 and 104 as compared to the configuration shown in FIG. 1A, the fiber reinforcement fraction is still not constant along the entire axis. Further, the resulting overall grid pattern as illustrated in FIG. 1B, does not readily allow weaving by a single fiber element in the surface of the cone.

Figure 2B:
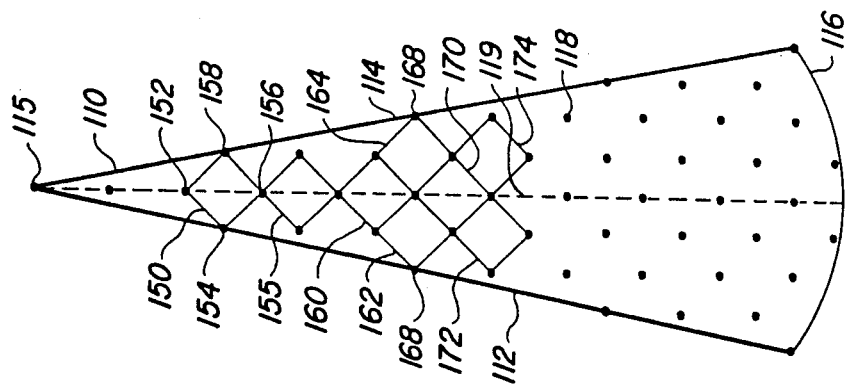
FIG. 2B shows another sector of a circle, which may be conformed to define a conical shape, in accordance with the present invention.
Figure 2A:
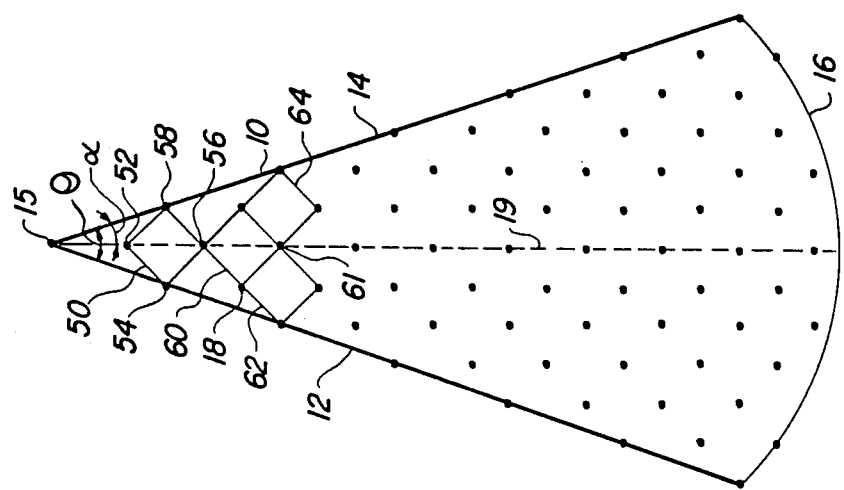
FIG. 2A shows a sector of a circle having a grid pattern inscribed thereon, which may be conformed to define a conical surface, in accordance with the present invention.

Referring to FIG. 2A, a planar sector 10 is defined by radii 12 and 14 and circumferential arc 16 of a circle and includes a grid pattern 18 disposed therein in accordance with the present invention. Grid pattern 18 is formed from a plurality of contiguous congruent squares, one of which is designated square 50.

Vertices 52 and 56, which define a diagonal of square 50, lie on radius 19 that bisects circumferential arc 16 and that is diametrically oppositely opposed the join or jam line meridian formed by the coincidence of radii 12 and 14 when sector 10 is formed into a cone 20 (FIGS. 3A–3D), so that square 50 appears like a diamond when apex 15 of sector 10 is pointing upward. Vertices 54 and 58 define the other diameter of square 50 and are disposed to lie on radii 12 and 14, respectively, so that when sector 10 is formed into cone 20 (FIGS. 3A–3D), vertices 54 and 58 will coincide along the join line meridian. The other members of the plurality of squares of pattern 18 are oriented with their diameters parallel to or colinear with the diameters of square 50. Hereinafter, reference to a diamond means a square oriented to appear as a diamond, unless otherwise noted.

Pattern 18 may be formed by symmetrical addition of diamonds. Diamond 60 includes a common vertex 56 with diamond 50 and a diametrically opposed vertex 61 disposed on radius 19. The other vertices of diamond 60 are appropriately disposed so that diamond 60 constitutes a square. Additionally diamonds 62 and 64, which include a respective common side with diamond 60 and respectively have a vertex coincident with radii 12 and 14, respectively, are added. A side of diamond 60 and 64 may be determined by extending the side of diamond 50 defined by vertices 54 and 56 thereof through vortex 56. Likewise a side of diamond 60 and 62 may be determined by extending the side of diamond 50 defined by vertices 56 and 58 thereof through vertex 56. Vertices for diamonds 60, 62 and 64 may be readily located along the sides so determined, since the sides of all diamonds are equal. The centers of diamonds 60, 62 and 64 form an inverted V. By repetition of the above process, wherein one diamond of the group added will always have a diameter coincident with radius 19, the entire surface of sector 10 may be covered with pattern 18. For pattern 18 of FIG. 2A it is noted that for each inverted V group of diamonds added, the group next closer circumferential arc 16 of sector 10 includes one more diamond in each leg of the V, than does the group next closer apex 15 of sector 10.

The trigonometric relationship between the angle $\theta$ formed by the intersection of radii 12 and 14 of sector 10 and the half angle $\alpha$ of a corresponding cone to be formed from sector 10 is:

$$\theta(\text{degrees}) = 360° \cdot (\sin \alpha).$$

For the configuration shown in FIG. 2A, the distance between vertex 52 of diamond 50 and apex 15 of sector 10 is equal to the diameter of diamond 50. Thus apex angle $\theta$ is approximately 36.86° and the corresponding conic half angle $\alpha$ is about 5.88°. In general, the distance from apex 15 of sector 10 to the vertex of the diamond nearest apex 15 and lying on radial bisector 10 will be equal to an integral (i.e. 0, 1, 2 ...) number of diameters of a diamond.

Pattern 18 is applicable to cones formed from a sector 10 having an apex angle less than or equal to 90°. Thus, the maximum effective conic half angle $\alpha$ for the present invention is where $\sin \alpha = 90°/360° = \frac{1}{4}$ or $\alpha = \sin^{-1}(\frac{1}{4})$, wherein half angle $\alpha$ is about 14.47°.

In general, for an angle $\phi$, which is designated as the angle between radius 19 and radius 12 or 14 (i.e. $\phi = \theta/2$ or $\theta = 2\phi$), the following equation applies:

$$\tan \phi = (1/(2n+1)), \text{ for } n = 0, 1, 2 \ldots,$$

wherein n is the integral number of diamond diameters from apex 15 to the closest vertex of a diamond on radial bisector 19. The angle $\phi$ then may be determined by the following equation:

$$\phi = \tan^{-1}(\tfrac{1}{2}n+1)$$

wherein $\tan^{-1}(x)$ is defined as the inverse tangent of x. For example, for values of n equal to 0, 1, 2 and 3, the corresponding values of angle $\phi$ are 45°, about 18.43°, about 11.31° and about 8.13°, wherein the corresponding values of angle $\theta$ are 90°, about 36.86°, about 22.62° and about 16.26° and the corresponding conic half angle $\alpha$ is about 14.47°, about 5.88°, about 3.60° and about 2.59°. Although the trigonometric relationships provide discrete values for conic half angle $\alpha$ at which pattern 18 of sector 10 exactly conformally maps onto the corresponding cone formed from sector 10, it may be desirable to modify the diagonal pattern 18 so that a range of values of half angle $\alpha$ about the discrete values of half angle $\alpha$ may be accommodated.

Referring to FIG. 2B, a sector 110 having a grid pattern 118 inscribed thereon is shown. Vertex 152 of square 150 is spaced a distance equal to two diameters of square 150 from apex 115 of sector 110. As shown, square 150 and a square 155 having a vertex 156 in common with square 150 include diameters lying coincident with radial bisector 119 of sector 110. Further, the V pattern as noted above with respect to FIG. 2A is formed in an analogous manner. However, each additional component of the grid is repeated so that two similar components are obtained before an additional square is added to each leg of the V. For example, single squares 150 and 155 are proximate apex 115 of sector 110. Three squares 160, having a diagonal on bisector 119, and squares 162 and 164 are proximate square 155. Three squares 170, having a diagonal on bisector 119, and squares 172 and 174 are proximate square 160. Of course, for any configuration the size of the squares may be selected to provide the desired density of sites for radial element placement and ultimate density of the in-plane elements per layer.

Referring to FIGS. 3A-3D, sector 10 may be formed into a cone 20, wherein radii 12 and 14 coincide along the join line 21 of cone 20. Axis 25 coincides with an equivalent axis of rotation of an appropriately dimensioned triangle suitable for forming cone 20 as an object of revolution. When grid pattern 18 is configured in accordance with the present invention as hereinabove described, grid pattern 18 may be exactly conformally mapped onto the surface of cone 20, so that each vertex of a square lying on radius 12 will coincide with a corresponding vortex of a square lying on radius 14 on join line 21. The vertices of the squares of grid pattern 18 are used to locate sites for radially extending fiber elements to be disposed on the conical surface in accordance with the present invention.

FIGS. 3A-3D illustrate a cone 20 conformed from sector 10 of FIG. 2A. The apex of the resulting cone 20 has been removed leaving a conic section, or frustum, 75, for facilitating the following description. As noted, FIGS. 3A-3D represent views looking at 0°, 90°, 180° and 270°, respectively, onto the conical surface of frustum 75 in a clockwise direction when viewed from the larger to the smaller base of frustum 75 with the 0° view taken 180° from join line 21. Also shown are element paths 90 disposed between predetermined vertices 95 of squares.

Figure 3A:
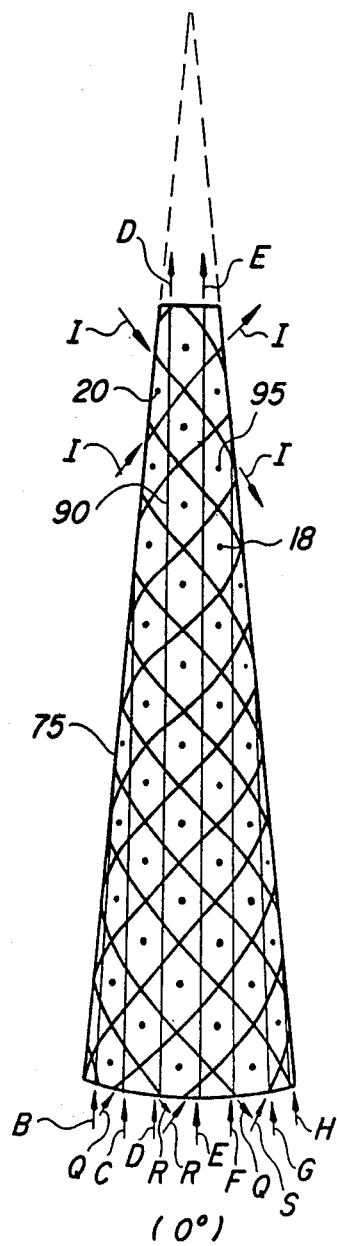

Individual element paths 90 and a suggested direction for laying an element or fiber along the respective element paths 90 and between vertices 95 are identified by letters A-T at the larger base of frustum 75. For the configuration shown, it is noted that element paths A-H extend directly between the larger and smaller base of frustum 75. For element path I, which is identified in all views of FIGS. 3A-3D, the suggested starting point shown at the larger base of frustum 75 in FIG. 3B results in an element path I which wraps around the conical surface near the smaller base of frustum 75 and ends at the larger base of frustum 75 as shown in FIG. 3D. Likewise element paths J-T are shown beginning and ending at the larger base of frustum 75. Portions of other element paths are identified in FIGS. 3A-3D to assist understanding of the invention.

In fabricating an object, such as a preform, having a conical surface, typically a form having a conical surface complementary to the conical surface of the preform is used. The form would have the vertices of the squares of grid 18 (FIG. 2A) identified thereon and generally include an element disposed at each vertex of the grid. The elements preferably extend substantially perpendicular to a localized portion of the conical surface of the form, so that in-plane elements can be situated between the radially extending elements. The form may be removed, as by machining, after at least parallel densification of the radial and in-plane elements as is known in the art. For an object having a conical surface, the radially extending fibers may be appropriately disposed over the surface.

For creating a layer having an invariant fiber fraction along the axis and circumference of the conical surface, individual fibers may be disposed along each of element paths A-T. When sequentially laid along paths starting with path A, the next fiber to be positioned is disposed such that a vertex 95 is disposed between the fiber being laid and the immediately preceding laid fiber along the element path being filled.

However, one of the advantages of the present invention is that the beneficial results may be obtained while an entire layer is wrapped from one continuous element or fiber. For ease of fabrication, a reversing element or spindle (not shown) may be placed axially beyond larger base and smaller base, respectively, of frustum 75, for reversing direction of fiber placement and for providing appropriate tension to the fiber. The fiber may be laid along element path A, say from the larger base to the smaller base of frustum 75, around a spindle (not shown), then along path B from the smaller base to the larger base of frustum 75, around the other spindle (not shown), then along path C from the larger base to the smaller base of frustum 75. This process may be sequentially repeated until path H is completed. Since the fiber wrapping path I (and paths J–T) will exit the conical surface of the larger base of frustum 75, it is only necessary that the spindle at the larger base of frustum 75 be used for reversing direction of the fiber. The process may be continued with fiber placed along path A, etc. after completion of path T until the desired thickness of material on predetermined number of layers, over the conical surface of frustum 75 is obtained. Winding with a continuous filament lends itself to automatic processing since the form or object having the conical surface need only be turned or indexed a predetermined arcuate amount at the end of each path 90 in order to present the next appropriate path to be followed by the filament. After completion of the desired winding, and at least partial densification of the resulting material to prevent relative motion between the fibers, the fibers may be trimmed at the large and small base of frustum 75 and the form, if used, may be removed. The resulting woven material exhibits an invariant fiber volume fraction along the axis and circumference of the conical surface without any seams or discontinuities.

Figure 3B:
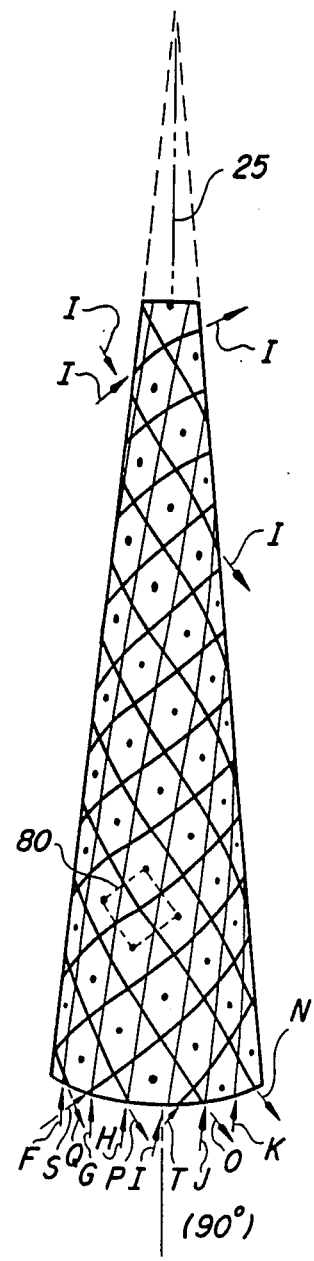
Figure 4:
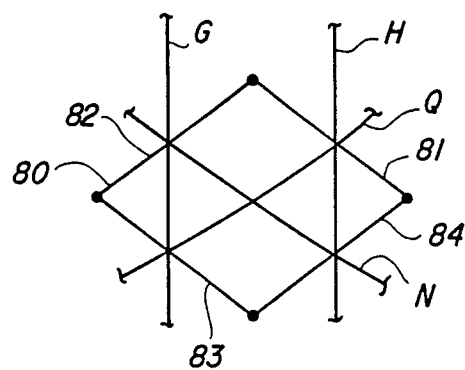
FIG. 4 shows a representative portion of the conical surface of FIG. 3B.

Shown in FIG. 4 is an enlarged view of a representative square 80 of grid pattern 18 identified in FIG. 3B. As shown, one pair of opposite sides 81 and 83 of square 80 is intersected by element path Q and the other pair of opposite sides 82 and 84 of square 80 is intersected by element path N. One pair of adjacent sides 82 and 83 of square 80 is intersected by element path G and another pair of adjacent sides 81 and 84 of square 80 is intersected by element path H. Neither of the noted adjacent pairs of sides of square 80 has a side in common with the other adjacent pair of sides of square 80.

Previous schemes for attempting to reduce and/or eliminate fiber volume fraction variation along the axis of conically woven structures have changed the size of the fibers used for weaving each direction and/or varied the number of fiber ends along the axis. In the present invention the same sized elements may be used for all radial elements and the conical surface elements may be equal to each other while obtaining the benefits of the present invention. Further, the radial and surface elements may be equal to each other. In addition, a single fiber weaving end can be used when forming the surface elements, which can therefore be developed without loose or extra end insertion for obtaining axial fiber fraction invariance.

The resulting woven fabric material, or web, may be densified by conventional techniques that are compatible with the radial and conical surface elements in order to form a composite material. Although the composition of the fiber for forming the elements of the weave is generally not critical for obtaining the benefits of the present invention, exemplary fibers may comprise fused silica or carbon with the ingredients used for densifying comprising silica and carbon, respectively.

The description above has included a cone for supporting the elements to be disposed thereon and/or to be reinforced by the elements. However, the invention is not so limited. The radial and conical surface elements may be combined in a conical shape in accordance with the teachings herein without resort to a cone, or the cone may be removed either after weaving or after the resulting woven net material has been densified for forming a conical shaped billet having an interior conical shaped void. Further, the present invention may be practiced using a frustum of a cone.

Thus has been illustrated and described a method for forming a three dimensional fibrous element preform having a conical surface, wherein the preform includes an invariant fiber volume fraction along the axis and circumference of the conical surface. Also, a method for reinforcing an object having a conical surface wherein a single fiber element may be used to form the in-plane fraction while obtaining invariant fiber fraction along the axis and circumference of the conical surface has been illustrated and described.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for reinforcing an object having a conical surface, the surface disposed about an axis, comprising:
   conformally mapping a plurality of contiguous congruent squares onto the conical surface, the conical surface defined by a conformed sector of a circle having the vertices of the plurality of squares identifiable thereon, wherein predetermined ones of the plurality of squares include a respective diagonal lying coincident with the radius of the circle that bisects the sector and, further wherein the vertex of the square closest the center of the circle and lying coincident with the radial bisector is spaced a distance equal to an integral number of diagonals of one of the squares from the center of the circle;
   providing a plurality of first elements and a plurality of second elements;
   disposing a respective one of the plurality of first elements at a respective vertex of the plurality of contiguous congruent squares; and
   laying a respective one of the plurality of second elements between respective predetermined ones of the plurality of first elements for forming a first layer conforming to the conical surface, wherein the first and second elements form a seamless structure having an invariant fiber volume fraction along the axis and circumference of the conical surface.

2. The method as in claim 1, wherein the step of laying further includes laying such that four segments of the second plurality of elements pass through a square of the plurality of squares.

3. The method as in claim 2, wherein the step of laying further includes laying a plurality of second elements such that two of the four segments pass through respective opposite sides of the square and the other two of the four segments pass through a respective pair of adjacent sides of the square, wherein one pair of adjacent sides has no side in common with the other pair of adjacent sides.

4. The method as in claim 3, wherein the plurality of second elements constitute a continuous member and the step of laying further includes laying the continuous member to form the first layer.

5. The method as in claim 3, further including densifying the first and second elements.

6. The method as in claim 1, further including repeating the step of laying until a predetermined number of layers is obtained.

7. The method as in claim 6, further including densifying the first and second elements.

8. The method as in claim 1, wherein the step of disposing further includes disposing respective ones of the plurality of first elements such that the respective ones are substantially perpendicular to a respective localized portion of the conical surface.

9. The method as in claim 1, wherein the plurality of second elements constitute a continuous member and the step of laying further includes laying the continuous member to form the first layer.

10. The method as in claim 1, wherein the step of laying includes laying a first one of the plurality of second elements over the conical surface, laying another one of the plurality of second elements over the conical surface such that a first element is between the first one and another one of the second elements, continuing to lay still another element over the conical surface until the first layer is formed, such that one of the first elements is between each still another element and a previously layed still another element.

11. A method for reinforcing an object having a conical surface, the surface disposed about an axis, comprising:

conformally mapping a plurality of contiguous congruent squares onto the conical surface, the conical surface defined by a conformed sector of a circle having the vertices of the plurality of squares identifiable thereon, wherein predetermined ones of the plurality of squares include a respective diagonal lying coincident with the radius of the circle that bisects the sector and, further wherein the vertex of the square closest the center of the circle and lying coincident with the radial bisector is spaced a distance equal to an integral number of diagonals of one of the squares from the center of the circle;

providing a plurality of first elements and a plurality of second elements;

disposing a respective one of the plurality of first elements at a respective vertex of a plurality of contiguous congruent squares, the plurality of squares conformable to the conical surface of the object and the vertices identifiable on the conical surface;

laying a second element between predetermined ones of the plurality of first elements for forming a first layer conforming to the conical surface, such that the first layer having no seams or discontinuities and having an invariant fiber volume fraction along the axis and circumference of the conical surface is obtained.

12. The method as in claim 11, wherein the step of laying further includes laying such that four portions of the second element pass through a square of the plurality of squares.

13. The method as in claim 12, wherein the step of laying further includes laying the second element such that two of the four portions of the second element pass through respective opposite sides of the square and the other two of the four segments pass through a respective pair of adjacent sides of the square, wherein one pair of adjacent sides has no side in common with the other pair of adjacent sides.

14. The method as in claim 11, wherein the step of disposing includes disposing a respective one of the plurality of first elements such that the respective one is substantially perpendicular to a respective localized portion of the conical surface.

* * * * *